Patented Dec. 16, 1941

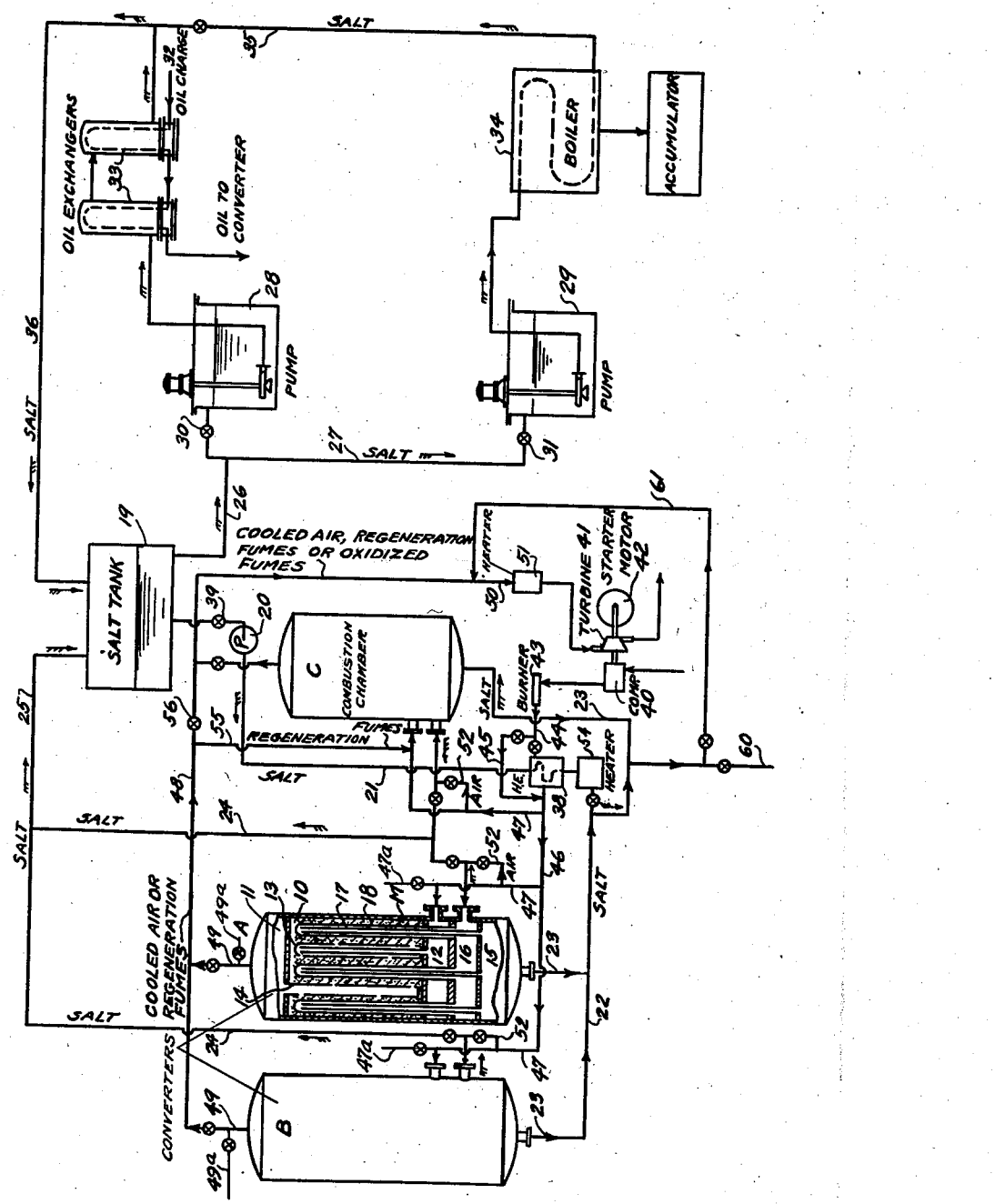

2,266,033

UNITED STATES PATENT OFFICE 2,266,033

STARTING AND CONTROLLING CONTACTING OPERATIONS

James W. Harrison, Woodbury, N. J., and Thomas B. Prickett, Philadelphia, Pa., assignors to Houdry Process Corporation, Wilmington, Del., a corporation of Delaware Application September 23, 1939, Serial No. 296,184

10 Claims. (Cl. 196—52)

The present invention relates to contacting reactions and is concerned particularly with the use of contact material in a cycle of alternating reactions and to heating the material for starting the reactions as well as the maintenance of the contact material at the proper reaction temperatures. Contact material as normally used in alternating reactions acquires a deposit of carbonaceous or other burnable matter in the treating or on-stream period of the cycle, which may be an endothermic or exothermic reaction, and when this deposit is removed during the alternate exothermic or regeneration reaction by oxidation in order to condition the material for the following treating or on-stream period of the cycle, heat is evolved which increases the temperature of the contact material and associated converter structure which must be controlled in order to prevent injury to the mass and converter parts.

Various methods have heretofore been devised for controlling the temperature of and maintaining the contact material and the associated converter structure, comprising the converter walls, tube sheets and various tubes with or without heat exchange fins, at the required temperatures for the different reactions. One highly successful operation is by utilizing an extraneous heat exchange medium to add heat during the endothermic period of the cycle and to withdraw the heat evolved during the exothermic period of the cycle in order to maintain the contact material at the desired on-stream temperature during one period and to maintain the mass at a temperature sufficiently high during the alternate period to hasten the exothermic or regeneration reaction and yet during this latter reaction to maintain the temperature sufficiently low or controlled so that injury to the converter structure or contact mass will be prevented. This alternate heating up and cooling down of the mass in changing from one period of the cycle to another tends to prolong the operating cycle and to make it thereby somewhat uneconomical.

Objects of the present invention therefore are directed to a new and efficient manner of using an extraneous heat exchange medium in controlling the temperature of the reactions; to reduce the operating cycle and control the operations, so as to produce economically, higher yields of products; to provide a highly efficient use of the heat storage capacity of the converter structure and contact mass; to utilize the evolved heat of reaction substantially continuously throughout the cycle of operation in a novel and efficient manner; to provide for the positive control of the temperature of the heat exchange medium entering the converters; to provide for greater flexibility in controlling the temperature of the entering reactants; and to provide for heating up the contact material and converter structure to reaction temperature in a minimum of time.

This invention may be considered to be an improvement over, a variant of, or a further development of the invention disclosed in the copending application of Clarence H. Thayer, Serial Number 183,305, filed January 4, 1938, for Starting up and temperature control of contact operations, which invention is directed to the idea of raising the temperature of the contact material and associated converter structure by passing heated air through the contact material to raise its temperature several hundred degrees and then passing heat exchange medium in highly heated condition through the heat exchange conduits to raise the temperature of the materias to substantially reaction temperature; controlling the temperature of the mass for the alternate reactions by admitting the extraneous heat exchange medium at a temperature intermediate the different reaction temperatures for passage through the heat exchange conduits located within the mass, as well as controlling the temperature of the heat exchange fluid so that it enters the heat exchange conduits at a substantially constant temperature by using a small portion of the main body of heat exchange fluid in heat exchange with the incoming oil charge or other reactants before returning and mixing the portion with the main body of the heat exchange fluid. The present invention attains the results accomplished by the invention disclosed in the above mentioned application in a different and in certain respects more positive and efficient manner by simultaneously passing heated air through the contact mass and heat exchange conduits and consequently heating up the mass and associated structure more quickly; by supplying the extraneous heat exchange fluid at a constant temperature which is below or near that of the lower reaction temperature so as to withdraw practically continuously the exothermic heat of reaction during the cycle of alternating reactions; and in controlling the temperature of the heat exchange fluid entering the converters by passing a portion thereof in heat exchange relation with the incoming oil charge in a manner which insures the proper heating of any particular charge.

The single figure of the drawing is a diagrammatic elevational view of one arrangement of apparatus with one of the converters sectioned to show the details.

The two converters which are indicated at A and B are merely representative of the number which may be used in carrying out the invention. It will be clear from the detailed description which follows that the invention is applicable to one converter for carrying out the different reactions in alternation or to any number of converters for simultaneously carrying out the alternate reactions in different converters. Each of the converters has a reaction chamber 10 as indicated in the sectioned converter, which contains a contact mass M, usually in the form of small pieces, fragments or molded pellets and which are capable of regeneration in situ. Any contact material which will promote the desired reaction may be utilized; for example, it may consist of adsorptive, silicious or clayey material and may comprise a blend or compound of silica with another metalliferous material such as alumina and may or may not have small amounts of other active materials or regeneration promoters. C indicates a combustion case having a reaction chamber and associated structural parts which are similar to those of the converters A or B. Only one combustion case is shown but any desired number may be used, depending on the number of reaction converters used in the plant. The reaction chamber of the combustion case contains a contact mass of a different type from that used in the converters and may comprise copper oxide or other suitable material, such as oxides or compounds of iron, cobalt, nickel and lead, usually on a suitable support or carrier.

As shown in the sectioned converter A, manifolds are provided for supplying reactants to and removing reaction products from the reaction chamber and other manifolds are provided for supplying and removing heat exchange fluid. The converters may have one manifold 11 at the top adjacent the reaction chamber and a manifold 12 below and adjacent the chamber which are used in supplying reactants to and removing reaction products from the reaction chamber through nested conduit assemblies 13, the outer conduit being perforated, and through the perforated conduits 14, which are in fluid communication with one or the other of these manifolds. The heat exchange fluid manifolds 15 and 16 may, as shown, be positioned directly below the manifold 12 and in fluid communication with inner and outer nested heat exchange fluid conduits 17 and 18, respectively, for passing a heat exchange fluid in indirect heat exchange relation with the contact mass.

The heat exchange fluid for controlling the temperature of the contact mass may comprise various fused salts or salt mixtures, molten metals of suitably low melting point, etc. and will be illustrated by a fused salt mixture of sodium nitrate and potassium nitrite of approximately eutectic proportions. In order to clarify the description, the flow of the fused salt through the various circuits is indicated by feathered arrows. The fused salt will be admitted to the reaction chamber at a substantially constant temperature, at about or below the lowest temperature reached during the cycle and at least below the average of the on-stream reaction so that during the cycle of alternate reactions it will substantially continuously pick up heat from the contact material and converter parts and may be circulated from tank 19 by means of pump 20 and follow line 21 to header 22, from which it is admitted to the lower heat exchange fluid manifolds 15 of the converters A and B through branches 23 and may also pass to the combustion case C from header 22 through a branch 23. From the manifolds 15 the salt will pass up through the inner heat exchange conduits 17 and through the outer conduits 18 into the heat exchange manifold 16 and return to the salt tank 19 through lines 24 and header 25. The salt in the tank 19 can be maintained at the desired constant temperature by extracting the heat picked up, which may be done by diverting from the tank any selected portion and heat exchanging this portion with other materials, for example, a predetermined portion may pass from the tank through line 26 to line 27 where it may be directed to one or both of the pumps 28 and 29 by proper manipulation of valves 30 and 31. The diverted portion of the liquid may be used as a heat exchange medium for any desired purpose but, as shown in the drawing, it is used to control either the temperature of the oil charge incoming through line 32 and oil exchangers 33 before the oil is admitted to the reaction converters, or it may pass through boiler 34 and be used entirely in making steam, or it may pass in parallel with the exchangers 33 and boiler 34.

In a preferred aspect of the invention the salt stream is divided when it reaches line 27 and a portion is sent through exchangers 33 and another portion is sent in parallel through boiler 34 and both portions are picked up in line 35 and returned through line 36 to the tank 19. The particular arrangement of dividing this salt stream and sending it in parallel in heat exchange relation with a plurality of materials permits greater flexibility in the control of the temperature of the heat exchange fluid which is returned to the mixing tank and is better adapted for regulating the temperature of various incoming reactants and also provides a more positive control of the temperature of these fluids. The valves 30 and 31 permit regulated portions of the fluid to pass through either exchangers 33 or boiler 34 and these portions may be selected in accordance with the temperature at which it is desired to send the particular oil charge into the converters, or with the amount of steam it is desired to convert in boiler 34. A steam accumulator is shown in communication with boiler 34 for storing excess steam.

The present invention is concerned with conditioning or heating the contact material to a proper temperature for the reactions and maintaining the contact material at the proper temperatures throughout the operation of the apparatus. Either manifold 11 or 12 may be used for distributing the incoming reactants while the remaining manifold will be used for collecting the products of the reaction. It is to be understood, however, that the invention is of value in controlling all alternating chemical reactions which are effected by or with the aid of contact masses and wherein during one of the reactions a burnable deposit is formed on the contact mass, and during the other reaction heat is evolved through oxidation of the deposit formed on the mass.

For the purpose of illustrating the invention, assume the bodies of contact mass in the converters A and B to be used alternately in the transformation of a petroleum fraction boiling above or to a substantial extent above the gasoline boiling range, as for example a light gas oil having an end boiling point of approximately 750° F., and in regenerating the contact mass of deposit formed thereon during the transforming or on-stream reaction. The on-stream reaction, which is endothermic, will be carried out at temperatures between 750° and 925° F. and preferably at temperatures between 825° and 875° F. while the regeneration or exothermic period of the cycle will start at about 825° F. and the contact mass will be maintained at a temperature low enough to prevent injury to the mass or converter parts during the strongest phase of the reaction and reduced in temperature by the salt to around 900° F. toward the end of the reaction. A stream of salt from the tank 19 will be sent in indirect heat exchange relation with the contact mass M of each converter A and B through the nested heat exchange conduits at a temperature preferably as low as the lower limits of the on-stream reaction and at least below the average temperature of the on-stream period or, in the case of the specific gas oil above mentioned, the salt will be admitted between 800 and 850° F. or for example 825° F. as it passes in heat exchange relation with the mass which is undergoing regeneration, the heat exchange fluid will pick up a substantial amount of heat and leave the mass at an increased temperature of approximately 10 to 30° F., depending upon the amount of burnable deposit laid down. The contact mass, which had previously been regenerated and is now at the temperature obtaining at the end of the regeneration period or approximately 900° F., is further reduced in temperature by the endothermic heat of reaction during the on-stream period and the salt, which passes in indirect heat exchange relation with this contact mass, also extracts the stored heat from the mass and associated structure during the reaction and further reduces the temperature gradually to around the lower limit of the on-stream reaction or about 835° F. when the on-stream reactant is a light gas oil, as heretofore mentioned. During the passage of the salt through the body of contact material which is on stream, the salt increases in temperature in an amount somewhat below that of the salt passing through the mass during regeneration and leaves the converter with a temperature increase of from 2° to 15°. The streams of heat exchange fluid after leaving the converters A and B enter the manifold 25, and pass to the salt tank 19 at a temperature of between 10° and 45° higher than the salt passing from the tank to the converters. A portion of the heat exchange liquid in tank 19 is then withdrawn through line 26 to line 27 and passes therefrom in heat exchange relation in parallel with the oil exchangers 33 and the boiler 34 so that this salt can be returned to the tank at a temperature low enough to adjust the main body of the heat exchange fluid in the tank to the temperature at which it is desired to admit the salt to the converters. The rate and amount of salt passing through the exchangers 33 will be determined according to the particular charging stock and the temperature at which the charge is to enter the converters, while the rate and amount of salt passing through the boiler 34 will depend on the steam requirements for plant operation. The high temperature of the salt in tank 19 readily permits the formation in boiler 34 of large quantities of high pressure steam. For example, the salt passing through the boiler will be in the neighborhood of 800° F. and by controlling the temperature level at which the salt leaves the boiler, for example at about 650° F., steam at above 400 pounds pressure and around 450° F., in temperature may be formed, which is highly desirable in efficient plant operation.

In another aspect this invention is concerned with heating up the apparatus to a temperature sufficient to start the reactions. If the contact material, tubes and other converter structure are at substantially atmospheric temperature, heated air is sent into the converters at a temperature sufficient to preliminarily heat the apparatus to a temperature ranging between 450° and 500° F. This is done according to the present invention in a manner to maintain portions of the converter, such as the tube sheets and walls bounding the several manifolds at the same or substantially the same temperature by sending heated air into the converters for simultaneous passage through the contact material and salt circuit, so that the various converter parts will not be affected by uneven contraction and expansion. At the beginning of the heating up period a compressor 40 is operated through a turbine 41 which is started by means of a motor 42 until sufficient air is compressed, circulated and returned to the turbine in condition to supply enough energy for operating the turbine without the aid of the motor. The circuit for the air through the apparatus for heating up the contact material and the converter structure and the circuit for the fumes which leave the converters during regeneration as well as the circuit for the oxidized fumes from the combustion case are indicated by the arrowed lines. The air is heated by compressor 40 and further heated, if necessary, by burner 43 to between 450° and 500° F. and passes to line 44 and around the heat exchanger 38 through by-pass 45 to header 46 from which it passes through branches 47 into the inlet manifolds 12 of the converters and the combustion case. From the manifolds 12 the air is distributed by the outer perforate tubes of the nested assemblies 13 through the contact masses and picked up by tubes 14 and carried to the upper manifolds 11 from which it is directed to the header 48 through branches 49 which are in communication with the manifolds 11 of the converters and combustion case. From the header 48 the cooled air is returned through line 50 to a heater 51, where it may be heated to a temperature to place it in condition for operating the turbine without the aid of the starting motor 42. Valved branches 52 lead from branch lines 47 to the heat exchange fluid lines 24 so that air may be admitted to a heat exchange fluid manifold of each of the converters and combustion case for passage through the heat exchange tubes simultaneously with the previously described passage of air from the manifolds 12 through the contact masses. It is preferable, as indicated in the drawings, to supply the air so that it passes first to the heat exchange fluid outlet manifolds 16 before passing through the heat exchange conduits 17 and 18 to the inlet manifolds 15 but of course the air may first enter the inlet manifolds 15 and pass through the tubes to the outer manifolds 16. The purpose of passing the heated air through this portion of the salt circuit is to maintain the partition or tube sheet between the manifolds 12 and 16 and the walls of these manifolds at substantially constant temperature to prevent unequal expansion and contraction. From the outlet manifolds 15 the cooled air will pass through branches 23 to the header 22 from which it may be permitted to escape through line 60 or returned to heater 51 through line 61 for passage to the turbine 41. After the contact mass and the associated parts are heated to a temperature of approximately 450 to 500° F., the valves in branches 52 will be closed so that no more air will be permitted to circulate in the heat exchange fluid circuit but the air which is gradually increased in temperature by burner 43 will continue to pass through the contact mass. At this time the salt in tank 19, which is maintained above its freezing point or in the neighborhood of 350° F., is then permitted to flow from the tank through the line 21 by opening valve 39 and passes through heat exchanger 38 to be further heated by the air coming from the burner 43 to the header 22, the valve in by-pass 45 being closed to direct the air through this heat exchanger. A salt heater 54 is also provided in the line 21 beyond the air heat exchanger 38 for gradually increasing the temperature of the heat exchange fluid before being circulated through the heat exchange circuit back to tank 19 so that the air and the salt are maintained at substantially the same temperatures while the respective fluids are passing through the contact mass and through the heat exchange circuit and permit the mass and the converter structure to gradually increase in temperature up to around 650° F. and preferably around 840° F. At this time the converters are ready to receive the on-stream reactants for beginning the process cycle. When the converters are properly heated up the valve in line 44 is closed to cut off the supply of air to the contact material and the on-stream reactants are sent into the reaction chambers A and B respectively, through valved lines 49a to manifolds 11 and reaction products withdrawn through valved lines 47a from manifolds 12, as indicated. The salt circuit may include manifolds and tubes disposed adjacent the exterior converter walls, as disclosed in application Serial No. 261,728 of Eugene J. Houdry, filed March 4, 1939, in which case the air at the beginning of the heating up period will flow through this portion of the circuit simultaneously with the flow of air through the contact material and nested heat exchange conduits and, after the preliminary heating, salt may be passed through this portion of the circuit.

After the on-stream period of the cycle, as heretofore mentioned, the contact material in the converter or converters which have undergone this period of the cycle is regenerated by passing an oxidizing medium through the material to burn off the deposit. The regeneration step is carried out by again supplying air, preferably heated to about 800° F., to start the combustion of the deposits which continues as air is continually supplied until the burning is completed. The regeneration fumes collected in header 48 are passed directly through line 50 and heater 51 for operating the turbine 41 or sent through line 55 by closing valve 56 into combustion case C where CO and any other burnable components remaining in the fumes are further oxidized by the particular contact material therein in order to increase their energy content before they are sent to the turbine 41.

The above description of the invention as specifically applied to the control of the transforming reaction for converting higher boiling hydrocarbons into lower boiling hydrocarbons and the alternate regeneration of the contact material following this reaction is to be considered merely as exemplary of the invention, the latter being limited only by the scope of the appended claims.

What we claim is:

1. In the treatment of reactant fluids in a reaction chamber used in a cycle of operation involving alternate periods of greater exothermic reaction heat and lesser endothermic reaction heat and wherein a heat exchange fluid is used to control the temperature of the reactions, the steps of circulating the heat exchange fluid at a constant temperature below that of the reactions in indirect heat exchange relation with the reaction chamber, withdrawing only a portion of the evolved heat from the reaction chamber during the exothermic period by the heat exchange fluid in order to permit the temperature of the reaction chamber to rise to a desired degree by storing heat therein, after a predetermined time starting the endothermic reaction and utilizing a portion of the heat stored in the reaction chamber to provide heat during this reaction period and extracting the remainder of the stored heat by the heat exchange fluid, then adjusting the temperature of the heat exchange fluid to the aforesaid constant temperature before again beginning the cycle of operation.

2. In the treatment of reactant fluids in the presence of solid porous contact material used in a cycle of operation involving alternate periods of greater exothermic reaction heat and lesser endothermic reaction heat and wherein a heat exchange fluid is used to control the temperature of the reactions, the steps of circulating the heat exchange fluid during the cycle at a constant temperature below that of the reactions, in indirect heat exchange relation with the contact material, withdrawing only a portion of the evolved heat of reaction during the exothermic period by the heat exchange fluid in order to permit the temperature of the contact material to rise to a desired degree by storing a portion of the evolved heat therein, after a predetermined time starting the endothermic reaction and utilizing a portion of the heat stored in the mass to provide heat during the reaction period and extracting the remainder of the stored heat from the contact material by the heat exchange fluid, then adjusting the heat exchange fluid to the aforesaid constant temperature before again beginning the cycle of operation.

3. In the treatment of fluid reactants in the presence of solid adsorptive mass, the steps of maintaining said mass in a cycle of operation involving an endothermic reaction with on-stream reactants to effect the desired treatment alternating with an exothermic reaction with regeneration reactants to remove combustible deposits which accumulate on the mass during the on-stream period, circulating a body of heat exchange medium which will remain substantially in liquid phase under the reaction conditions during the cycle in indirect heat exchange relation with the mass and at a constant temperature below that of the reactions, withdrawing only a portion of the evolved heat of reaction during the exothermic reaction by the heat exchange medium in order to permit the mass to rise in temperature during this reaction and store the remainder of the evolved heat therein and after a predetermined period of time stopping the exothermic reaction and starting the endothermic reaction and during this reaction utilizing the stored heat to supply the heat of reaction.

4. In the treatment of fluid reactants in the presence of solid adsorptive mass, the steps of maintaining said mass in a cycle of operation involving an endothermic reaction with on-stream reactants to effect the desired treatment alternating with an exothermic reaction with regeneration reactants to remove combustible deposits which accumulate on the mass during the on-stream period, circulating a body of heat exchange medium which will remain substantially in liquid phase under the reaction conditions during the cycle in indirect heat exchange relation with the mass and at a constant temperature below that of the reactions, withdrawing only a portion of the evolved heat of reaction during the exothermic reaction by the heat exchange medium in order to permit the mass to rise in temperature and store the remainder of the evolved heat therein and after a predetermined time stopping the exothermic reaction and starting the endothermic reaction and during this reaction utilizing the stored heat to supply the heat of reaction, withdrawing a desired portion of the heat exchange medium and passing it in heat exchange relation with one of the reactants in order to extract heat from the medium and returning said portion to the main body of the medium in order to adjust the temperature of the main body to the aforesaid constant temperature.

5. In the treatment of fluid reactants in the presence of solid adsorptive mass, the steps of maintaining said mass in a cycle of operation involving an endothermic reaction with on-stream reactants to effect the desired treatment alternating with an exothermic reaction with regeneration reactants to remove combustible deposits which accumulate on the mass during the on stream period, circulating a body of heat exchange medium during the cycle which will remain substantially in liquid phase under the reaction conditions in indirect heat exchange relation with the mass and at a constant temperature below that of the reactions, withdrawing only a portion of the evolved heat of reaction during the exothermic reaction by the heat exchange medium in order to permit the mass to rise in temperature and store the remainder of the evolved heat therein and after a predetermined time stopping the exothermic reaction and starting the endothermic reaction and during this reaction utilizing the stored heat to supply the heat of reaction, withdrawing a desired portion of the heat exchange medium and passing it in parallel streams in heat exchange relation with other fluids including at least one of the reactants in order to extract heat from the medium and returning said portion to the main body of the medium in order to adjust the temperature of the main body to the aforesaid constant temperature.

6. In the use of one or more converters each having a reaction chamber and manifolds in communication therewith, wherein each reaction chamber contains contact material which is employed in cyclic operation involving alternate on-stream and regeneration reactions and a heat exchange fluid is circulated to control the temperature of the reaction, the method of heating up the converters and contact material to desired temperature for effecting the reactions which comprises supplying a heated gaseous medium to the manifolds for passage through the contact material in direct heat exchange relation therewith and through confined passageways in indirect heat exchange relation with the contact material, gradually increasing the temperature of the gaseous medium and continuing its circulation until the converters and contact material are preliminarily heated, cutting off the flow of gaseous medium and supplying a heat exchange fluid to one of the manifolds for passage in indirect heat exchange relation with the contact material, gradually raising the temperature of said fluids and continuing their circulation through the contact mass until the contact material and converters are heated to approximately the temperature of the desired on-stream reaction, cutting off the flow of the gaseous medium and circulating the heat exchange fluid at about the lower limit of the on-stream temperature in order to substantially constantly withdraw heat from the contact material during a cycle of operations.

7. In the use of one or more converters each having a reaction chamber and manifolds in communication therewith, wherein each reaction chamber contains contact material which is employed in a cycle of operations involving alternate reaction periods of greater and lesser heats of reaction, and a heat exchange fluid is circulated to control the temperature of the reactions, the process of heating up the converters and contact material to desired temperature for effecting the alternate reactions which comprises heating a gaseous medium and supplying it to the manifolds for passage through the contact material in direct heat exchange relation therewith and for passage through confined passageways in indirect heat exchange relation with the contact material, gradually increasing the temperature of the gaseous medium and continuing its circulation until the converters and contact material are preliminarily heated, cutting off the passage of the gaseous medium to one of the manifolds and supplying thereto a heat exchange medium in heated condition for passage in indirect heat exchange relation with the contact material, continuing the supply of the gaseous medium and the heat exchange medium to the manifolds and gradually increasing their temperatures until the converters and contact material reach approximately the temperature of the lower temperature period of the cycle.

8. In the use of one or more converters each having a reaction chamber and manifolds in communication therewith, wherein each reaction chamber contains contact material which is employed in a cycle of operations involving alternate regeneration and on-stream reactions carried out at higher and lower temperatures, respectively, and a heat exchange medium is circulated to control the temperature of the reactions, the process of heating up the contact material and converters to desired temperature for effecting the alternate reactions which comprises heating a gaseous medium and supply it to the manifolds for passage through the contact material in direct heat relation therewith and for passage through confined passageways in indirect heat exchange relation with the contact material, gradually increasing the temperature of the gaseous medium and continuing its circulation until the converters and contact material are preliminarily heated, cutting off the passage of the gaseous medium to one of the manifolds and supplying thereto a liquid heat exchange medium in heated condition for passage in indirect heat exchange relation with the contact material, continuing the passage of the gaseous medium and the liquid medium and gradually increasing their temperatures until the contact material and converters reach approximately the temperature of the on-stream period of the cycle.

9. In the use of one or more converters each having a reaction chamber and manifolds in communication therewith, wherein each reaction chamber contains contact material which is employed in a cycle of operations involving alternate regeneration and on-stream reactions carried out at higher and lower temperatures, respectively, and a heat exchange medium is circulated during the lower temperature period of the cycle, the process of heating up the contact material and converters to desired temperature for effecting the alternate reactions which comprises heating a gaseous medium and supplying it to the manifolds for passage through the contact material in direct heat relation therewith and for passage through confined passageways in indirect heat exchange relation with the contact material, gradually increasing the temperatures of the gaseous medium and continuing its circulation until the converters and contact material are preliminarily heated to a temperature substantially below the temperature of the on-stream reaction period, cutting off the passage of the heated gaseous medium to one of the manifolds and supplying thereto heat exchange medium for passage in indirect heat exchange relation with the contact material and comprising a fused mixture of nitrates and nitrites heated above 250° F. to place it in the liquid state, continuing the passage of the gaseous medium and the liquid heat exchange medium, gradually increasing their temperatures until the contact material and converters reach approximately the temperature of the on-stream period of the cycle.

10. In the use of one or more converters each having a reaction chamber and manifolds in communication therewith, wherein each reaction chamber contains contact material which is employed in a cycle of operations involving alternate periods of higher and lower temperature reactions and a heat exchange medium is circulated to control the temperature of the reactions, the process of heating up the contact material and converters to desired temperature for effecting the alternate reactions which comprises heating a gaseous medium and supplying it to the manifolds for passage through the contact material in direct heat relation therewith and for passage through confined passageways in indirect heat exchange relation with the contact material, gradually increasing the temperature of the gaseous medium and continuing its circulation until the converters and contact material are preliminarily heated to a temperature substantially below the temperature of the lower temperature reaction period, cutting off the passage of the heated gaseous medium to one of the manifolds and supplying thereto a heat exchange liquid having greater heat conductivity than the gaseous medium for passage in indirect heat exchange relation with the contact material, heating the gaseous fluid to approximately the temperature of the lower temperature period of the cycle and passing it in heat exchange relation with the heat exchange liquid to give up heat thereto, then continuing the passage of the gaseous medium and the liquid medium at gradually increased temperatures until the converters and contact material reach approximately the temperature of the lower temperature period of the cycle.

JAMES W. HARRISON.
THOMAS B. PRICKETT.